United States Patent
Wojcik et al.

(10) Patent No.: US 11,822,914 B2
(45) Date of Patent: Nov. 21, 2023

(54) UPGRADE FOR RELATIONAL DATABASE DEPENDENT APPLICATION

(71) Applicant: INTERNATIONAL BUSINESS MACHINES CORPORATION, Armonk, NY (US)

(72) Inventors: Wojciech Wojcik, Bochnia (PL); Bartosz Tomasik, Cracow (PL); Krzysztof Rudek, Nowy Wisnicz (PL); Jaroslaw Jurowicz, Zielonki (PL)

(73) Assignee: International Business Machines Corporation, Armonk, NY (US)

(*) Notice: Subject to any disclaimer, the term of this patent is extended or adjusted under 35 U.S.C. 154(b) by 73 days.

(21) Appl. No.: 17/517,730

(22) Filed: Nov. 3, 2021

(65) Prior Publication Data
US 2023/0132690 A1 May 4, 2023

(51) Int. Cl.
*G06F 8/65* (2018.01)
*G06F 8/71* (2018.01)
*G06F 16/21* (2019.01)

(52) U.S. Cl.
CPC .......... *G06F 8/65* (2013.01); *G06F 8/71* (2013.01); *G06F 16/212* (2019.01)

(58) Field of Classification Search
CPC ............. G06F 8/65; G06F 16/212; G06F 8/71
USPC ........................................................ 717/170
See application file for complete search history.

(56) References Cited

U.S. PATENT DOCUMENTS

| 10,656,933 | B2 | 5/2020 | Radermacher et al. |
| 11,269,620 | B1* | 3/2022 | Hoeft ................. G06F 8/656 |
| 2014/0101646 | A1* | 4/2014 | Buzaski ........... G06F 16/2365 717/168 |
| 2020/0034342 | A1* | 1/2020 | Mohapatra ........ G06F 16/213 |
| 2020/0183896 | A1* | 6/2020 | Nigam ................ G06F 8/65 |
| 2022/0083502 | A1* | 3/2022 | Bestfleisch ....... G06F 16/901 |

OTHER PUBLICATIONS

Lin et al, "Collateral Evolution of Applications and Databases", 2009, [Online], pp. 31-40, [Retrieved from internet on Jul. 25, 2023], <chrome-extension://efaidnbmnnnibpcajpcglclefindmkaj/https://dl.acm.org/doi/pdf/10.1145/1595808.1595817> (Year: 2009).*

(Continued)

*Primary Examiner* — Geoffrey R S T Leger
*Assistant Examiner* — Zengpu Wei
(74) *Attorney, Agent, or Firm* — Schmeiser, Olsen & Watts, LLP; Edward Wixted

(57) ABSTRACT

A method includes providing a relational database and at least one schema describing tables of the relational database with columns of the relational database, providing an application executing read/write or delete jobs in the relational database where the application is running in a cloud environment, upgrading the application running in the cloud environment to a new version of the application. The application uses pods to perform the steps of the upgrading. The method includes replacing an old version of the application using an intermediate version of the application, where the intermediate version of the application behaves differently depending on values of definitions in a new supportive column created in the relational database, and replacing the intermediate version of the application with pods using the new version of the application.

18 Claims, 8 Drawing Sheets

(56) References Cited

OTHER PUBLICATIONS

Mell, Peter et al.; "The NIST Definition of Cloud Computing;" National Institute of Standards and Technology; Special Publication 800-145; Sep. 2011; 7 pages.

Authors et. al.: Disclosed Anonymously, Method and System for Continuous Operation of SaaS environments during Upgrades, An IP.com Prior Art Database Technical Disclosure, IP.com No. IPCOM000242049D, IP.com Electronic Publication Date: Jun. 16, 2015, 3 pages.

Marcin Grzejszczak, Zero Downtime Deployment with a Database, Published In: Spring Blog, Publication Date: May 31, 2016, https://spring.io/blog/2016/05/31/zero-downtime-deployment-with-a-database, 26 pages.

Thorben Janssen, Update your Database Schema Without Downtime, Published in: thorben-janssen.com Publication Date: NA, https://thorben-janssen.com/update-database-schema-without-downtime/, 20 pages.

Kbarnard, Zero-downtime Deployment in Kubernetes with Jenkins, Kubernets Blog, Apr. 30, 2018, https://kubernetes.io/blog/2018/04/30/zero-downtime-deployment-kubernetes-jenkins/, 6 pages.

Edition-based redefinition (EBR), retrieved on Nov. 1, 2021 from the Internet: https://www.oracle.com/database/technologies/high-availability/ebr.html, 2 pages.

Michael Haynes, DevOpsDays Warsaw—Pipelines for Database Provisioning and Administration, Nov. 19, 2020, YouTube, https://www.youtube.com/watch?v=DqMDVf4mTx0&list=PLnKL6-WWWE_X5k3GyLSeaqg_HKqg-EF8Q&t=1359s, 4 pages.

IBM Db2 Warehouse on Cloud, https://www.ibm.com/docs/en/db2woc?topic=procedure-admin-move-table-move-tables-online, 33 pages.

* cited by examiner

US 11,822,914 B2

UPGRADE FOR RELATIONAL DATABASE DEPENDENT APPLICATION

BACKGROUND

The present invention relates to reducing downtime for upgrades to cloud services that depend on relational databases. More specifically, the invention relates to cloud applications based on micro-services architecture (e.g. hosted on a Kubernetes cluster) whereby upgrades are performed and downtime for service must be minimized or eliminated. Managing these types of cloud services or micro-services often requires the performance of upgrades of a single Pod with little or no service downtime (i.e. instance of a running process in a Kubernetes cluster).

SUMMARY

An embodiment of the present invention relates to a method, and associated computer system and computer program product, for reducing downtime for relational database dependent micro-services. One or more processors of a computer system providing a relational database and at least one schema describing tables of the relational database with columns of the relational database, and provide an application executing read/write or delete jobs in the relational database, wherein the application is running in a cloud environment. The one or more processors of the computer system upgrade the application running in the cloud environment to a new version of the application, where the application uses pods to perform the steps of the upgrading. The one or more processors of the computer system replace an old version of the application using an intermediate version of the application, where the intermediate version of the application behaves differently depending on values of definitions in a new supportive column created in the relational database. The one or more processors of the computer system replacing the intermediate version of the application with pods using the new version of the application.

DETAILED DESCRIPTION

The present invention relates to a method and schema for upgrading a relational database dependent application or service or micro-service. The present invention may utilize Kubernetes cluster(s) and application deployments on worker nodes in a cloud system using pods. Specifically, the present invention recognizes that existing examples of blue-green deployment for application upgrades using Kubernetes work when the application does not rely on data stored with a hard-defined schema, such as a relational database. In cases with relational databases, problems may arise when an upgrade requires the performing of database schema changes that are not backwards compatible. Example of such schema upgrades may be changing datatypes from a column (e.g. from VARCHAR to CLOB to allow for storing longer texts).

In prior art solutions, the contents of the database may be migrated without loss using SQL scripts, but in this case the old version of the application cannot be run in parallel to the new one. This creates downtime during the upgrade process (i.e. bringing down an old application version, performing the database schema migration, then starting the new application version).

The present invention contemplates the following solution. Whenever a schema requires to change an existing column, a new column must be added, temporarily preserving the old column for the purposes of migrating the data and continuous operation off the old application version. The present invention contemplates zero-downtime migration and upgrade requirements, without requiring any special database level vendor specific features, and thus can work with any relational database management system.

Figure 1:
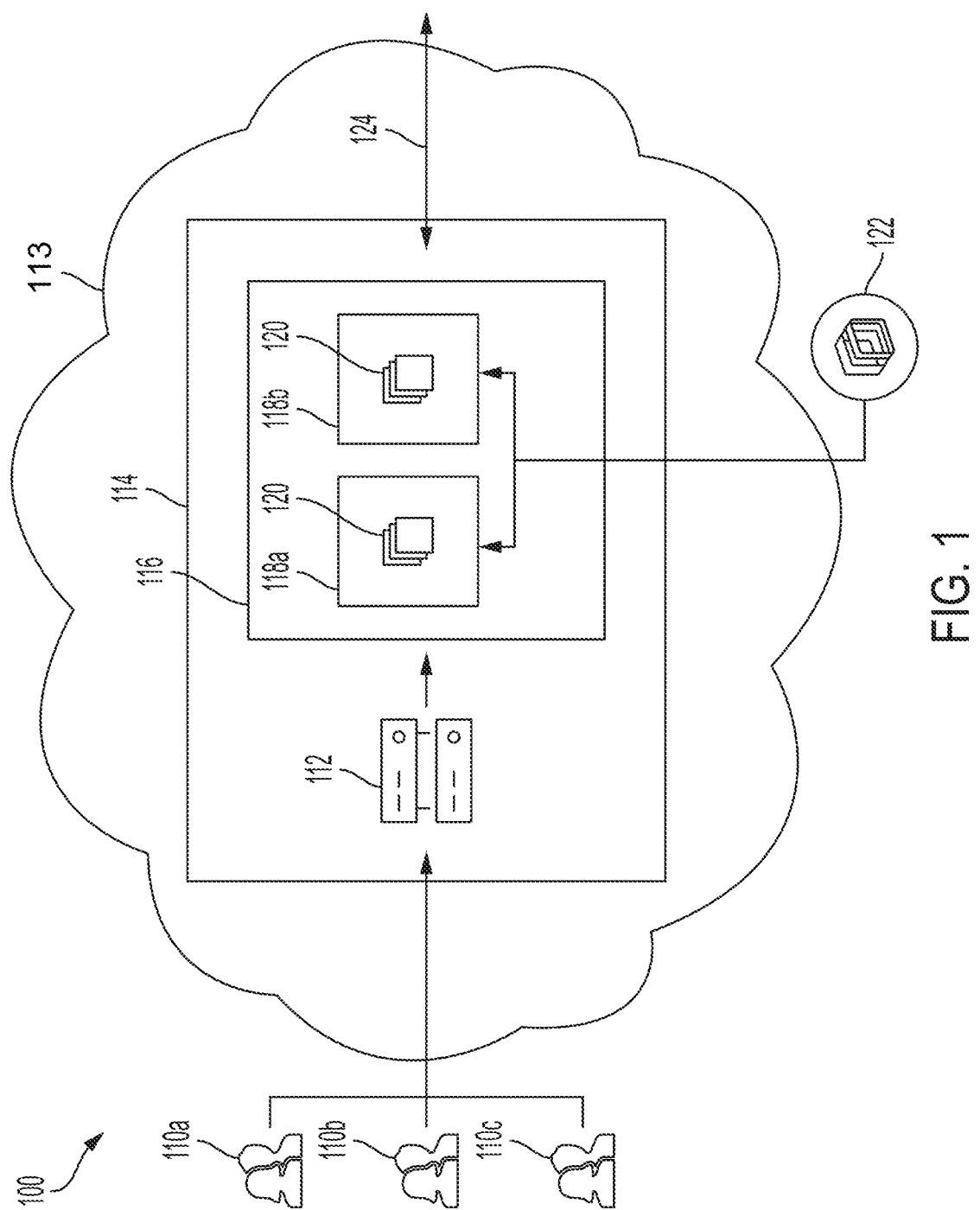
FIG. 1 depicts a block diagram of a system for upgrading relational database dependent services, in accordance with embodiments of the present invention.

FIG. 1 depicts a block diagram of a system 100 for upgrading relational database dependent services, in accordance with embodiments of the present invention. The system 100 includes a plurality of users 110a, 110b, 110c which are connected via a gateway 112 to a cloud implementation 113 of Kubernetes cluster 114 which may be configured to implement one or more services, microservices or applications for the plurality of users 110a, 110b, 110c. The Kubernetes cluster 114 includes a worker pool 116 having a plurality of worker nodes 118a, 118b, each running a plurality of deployed pods 120. The deployment for the worker pool 116 is shown connected to a container registry 122 which may be located inside or outside of the cloud implementation 113. The deployment for the worker pool 116 may further be connected via one or more connections 124 to one or more outside services for adapting, supplementing or otherwise impacting the one or more services, microservices, or applications. For example, the deployment may connect to a tone analyzer service, a log analysis service, a cloud monitoring service or the like (not shown).

The gateway 112 may represent many different kinds of load balancing and routing in the Kubernetes cluster 114, and may accept HTTP requests. The gateway 112 may include APIs or other functionality for impacting data flow into the Kubernetes cluster 114. Moreover, the gateway 112 may be a feature which conducts the flow of information consistent with the upgrade or migration process provided herein. The Kubernetes cluster 114 may be any set of nodes that run containerized applications. While a single worker pool 116 is shown within the Kubernetes cluster 114, a plurality of worker pools 116 are contemplated running any number of services, microservices and/or applications. The pods 120 may each be a small deployable unit of computing that you can manage within the Kubernetes cluster 114. In one example, the pods 120 may be the smallest deployable units that can be created or managed. The pods 120 may each represent a single instance of a process running in the Kubernetes cluster 114. The pods 120 may each contain one or more containers, such as Docker containers. The container registry 122 may be configured to manage docker images, perform vulnerability analysis and generally manage accessibility within the Kubernetes cluster 114.

As understood herein, blue/green deployments for Kubernetes are a form of progressive delivery where a new version of the application is deployed while the old version still exists. The two versions of the application coexist for a brief period of time while user traffic is routed to the new version, before the old version is discarded (if all goes well). The present invention contemplates an upgrade procedure which creates three versions of an application, deployed using blue-green deployment of Kubernetes in a sequence (where an old version is running and coexisting with the new version during the upgrade). However, unlike a typical blue/green deployment, in the present invention, an intermediate version of the application is also contemplated.

Figure 2:
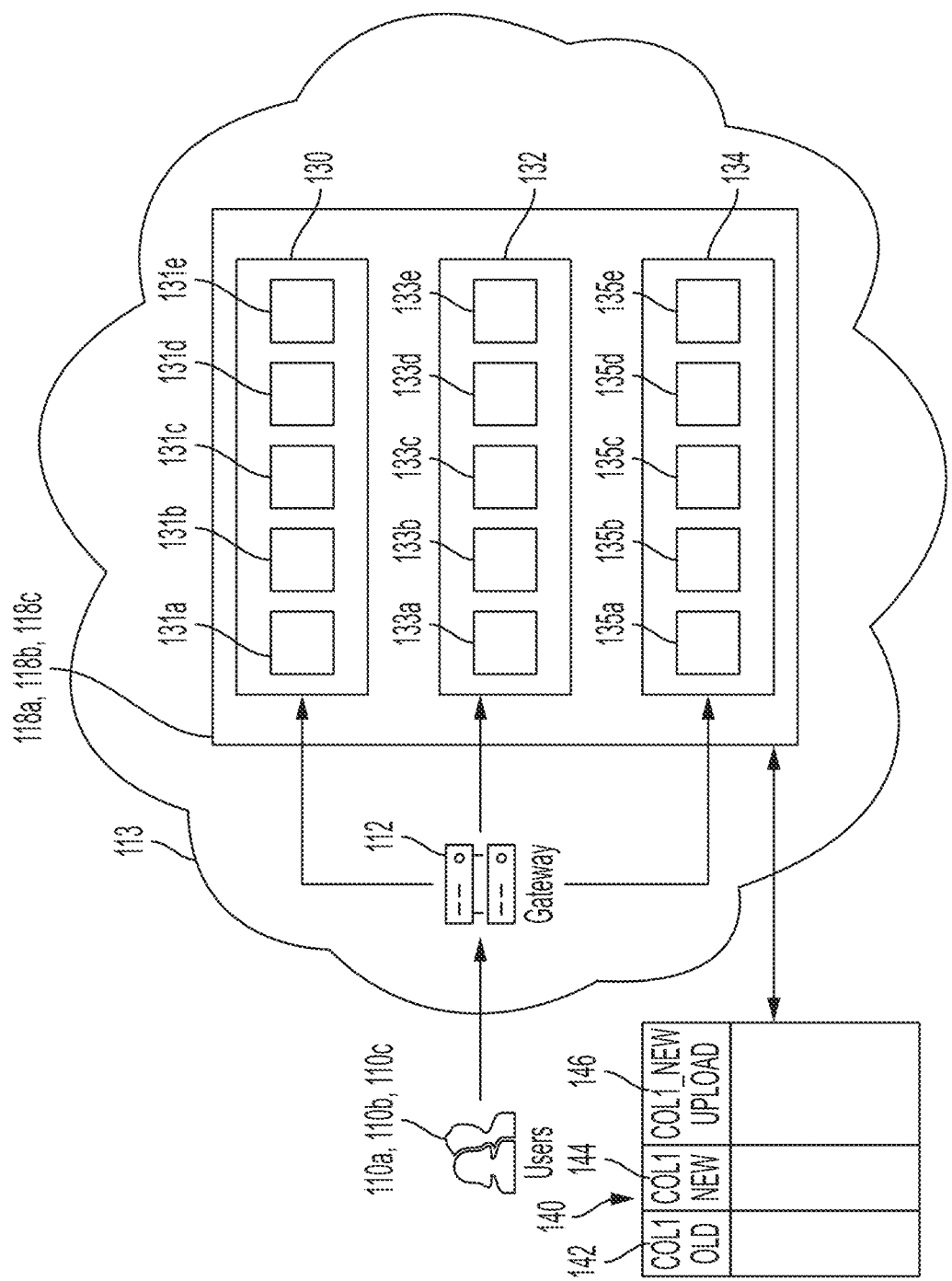
FIG. 2 depicts three versions of an application deployed during an upgrade process of the system of FIG. 1, in accordance with embodiments of the present invention.

FIG. 2 depicts three versions of an application deployed during an upgrade process of the system 100 of FIG. 1, in accordance with embodiments of the present invention. In particular, the system 100 is shown whereby an upgrade or migration process for an application has begun, whereby one or more of the worker nodes 118a, 118b is running an old version 130 of the application having five pods 131a, 131b, 131c, 131d, 131e, an intermediate version 132 of the application having five pods 133a, 133b, 133c, 133d, 133e, and a new version 134 of the application having five pods 135a, 135b, 135c, 135d, 135e. The new version 134 of the application will be the final version of the application once the upgrade or migration process is complete, while the old version 130 is the original version of the application prior to the upgrade or migration process.

The application contemplated herein may be dependent on a relational database 140 having old column definitions 142, new column definitions 144 and a new supportive column 146 created in the relational database 140. The new supportive column 146 may be set to FALSE by default, and may be set to TRUE after a pod upgrade process has completed.

The versions 130, 132, 134 of the application may behave with respect to the relational database 140 as follows. The old version 130 of the application may be configured to include pods that read and write data only to and from the old column definitions 142 in the relational database 140.

The intermediate version 132 of the application may be configured to include pods which behave differently depending on the value of the new supportive column 146. If the value of the new supportive column 146 is TRUE, the intermediate version 132 behaves like the new version 134 of the application. If the value of the new supportive column 146 is FALSE, the intermediate version 132 writes data to both the old column definitions 142 and the new column definitions 144, and further reads data from the old column definitions 142. In other words, except in writing data to the new column definitions 144, the intermediate version 132 include pods which behave like the old version.

The new version 134 of the application may be configured to include pods which read and write data only to and from the new column definitions 144, and fully supports the new capabilities associated with the upgrade or migration.

By using the above, schema migration may be started as part of the pod initialization procedure for the intermediate version 132. For example, when the first pod for the intermediate version 132 reports readiness status, it means that schema migration process is completed.

Data migration may then begin as part of the pod initialization procedure for the new version 134. When the first pod for the new version 134 reports readiness status, it means that data values migration from the old column definitions 142 to the new column definitions 144 is completed and all the rows in the new supportive column 146 are set to TRUE.

The present invention then contemplates using an additional cleanup script which can be triggered once the upgrade process is completed, whereby the old column definitions 142 and the new supportive column 146 may be deleted or removed, along with the data therein.

Figure 3:
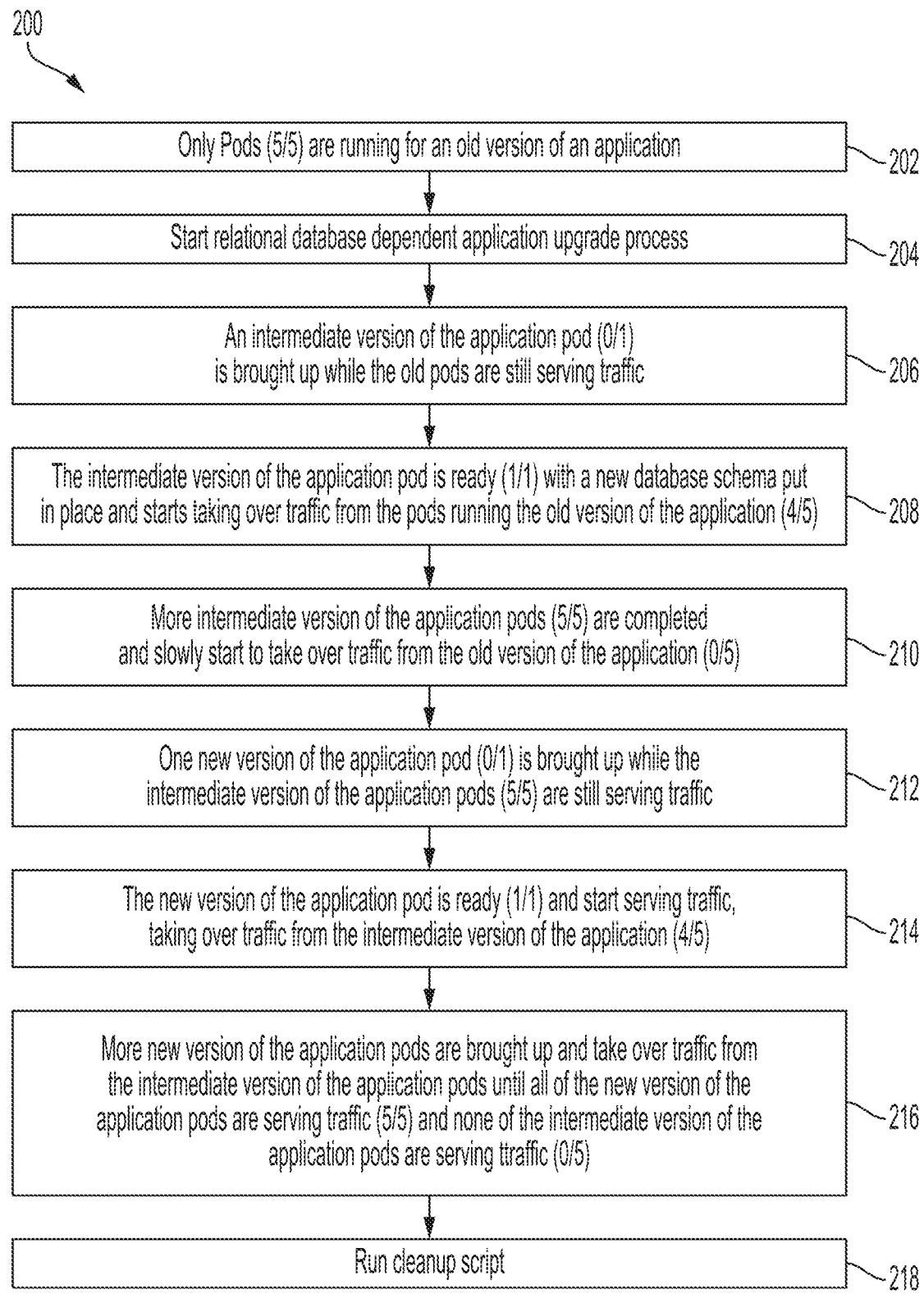
FIG. 3 depicts a flow chart of a method for upgrading relational database dependent services using the system of FIG. 1, in accordance with embodiments of the present invention.

FIG. 3 depicts a flow chart of a method 200 for upgrading relational database dependent services using the system of FIG. 1, in accordance with embodiments of the present invention. According to the method 200, according to a first step 202, only Pods (5/5) are running for an old version of an application. For example, with reference to FIG. 2, at this step 202, only the pods 131a, 131b, 131c, 131d, 131e of the old version 130 of the application are running. At a next step 204, a relational database dependent application upgrade process is started.

At a next step 206, an intermediate version of the application pod (0/1) is brought up while the old pods are still serving traffic. With reference to FIG. 2, at this step 206, the pod 133a of the intermediate version 132 is brought up while the old pods 131a, 131b, 131c, 131d, 131e are still serving traffic. During step 206, for example, the new column definitions 144 and the new supportive column 146 may be added to the relational database 140 with an ALTER TABLE sql statement, for example. At this point, the new column definitions 144 may not contain any data yet, and the default value of the new supportive column 146 is FALSE for each row.

At a next step 208, the intermediate version of the application pod is ready (1/1) with a new database schema put in place and starts taking over traffic from the pods running the old version of the application (4/5). For example, with reference to FIG. 2, at step 208, the first pod 133a of the intermediate version 132 is ready and starts taking traffic over from the pod 131a of the old version 130, while the other four pods 131b, 131c, 131d, 131e of the old version 130 are still serving traffic.

At this point, rows in the relational database 140 may contain data as follows. Data in the old column definitions 142 is data handled by pods from the old version 130 of the application and not the intermediate version 132. For requests handled by pods from the intermediate version 132, data is found in both the old column definitions 142 and the new column definitions 144. When there are different values in the old column definitions 142 and the new column definitions 144, it means a request was handled by a pod from the old version 130, but was previously handled by a pod from the intermediate version 132.

In a next step 210, more intermediate version of the application pods (5/5) are completed and slowly start to take over traffic from the old version of the application (0/5). With reference to FIG. 2, at the end of the step 210, each of the application pods 133a, 133b, 133c, 133d, 133e of the intermediate version 132 are serving traffic while none of the pods 131a, 131b, 131c, 131d, 131e of the old version 130 are.

At a next step 212, one new version of the application pod (0/1) is brought up while the intermediate version of the application pods (5/5) are still serving traffic. With reference to FIG. 2, at the step 212, the pod 135a is brought up while the intermediate version 132 of the application pods 133a, 133b, 133c, 133d, 133e are still serving traffic. Next, at a step 214, the new version of the application pod is ready (1/1) and starts serving traffic, taking over traffic from the intermediate version of the application (4/5). Here, the data from the old column definitions 142 is now fully migrated over to the new column definitions 144 via, for example, sql update table set COL1_NEW=cast transform data (COL1_OLD) statement together with setting the new supportive column 146 to true, executed together. At this point, the pods from the intermediate version 132 of the application detect that the new supportive column 146 data has been set to true and thereby behaves like pods from the new version 134 of the application.

With reference to FIG. 2, at this step 214, the new version 134 of the application pod 135a is ready and starts serving traffic taking over traffic from the pod 133a of the intermediate version 132, while the other four pods 133b, 133c, 133d, 133e of the intermediate version 132 are still serving traffic. At a step 216, more new version of the application pods are brought up and take over traffic from the intermediate version of the application pods until all of the new version of the application pods are serving traffic (5/5) and none of the intermediate version of the application pods are serving traffic (0/5). With reference to FIG. 2, at the end of step 216, each of the application pods 135a, 135b, 135c, 135d, 135e of the new version 134 are serving traffic while none of the pods 133a, 133b, 133c, 133d, 133e of the intermediate version 132 are. Here, all the rows in the relational database 140 have valid data in the new column definitions 144. Some may still have corresponding old values within the old column definitions 142, but these old values are no longer used or needed.

At a final step 218, a cleanup script is run. This will drop, erase or delete the old column definitions 142 and the new supportive column 146, as well as the data associated therewith. This step 218 is optional and may not affect runtime in any way. The purpose of step 218 is to clean up and reclaim space in the database and reduce storage space.

It should be understood that the methodology described hereinabove with respect to the method 200 is exemplary and not limiting. An application can include any number of pods. However, the above methodology satisfies zero-downtime requirements, without requiring any special database level vendor specific features, and thus can work with any relational database management system.

Figure 4A:
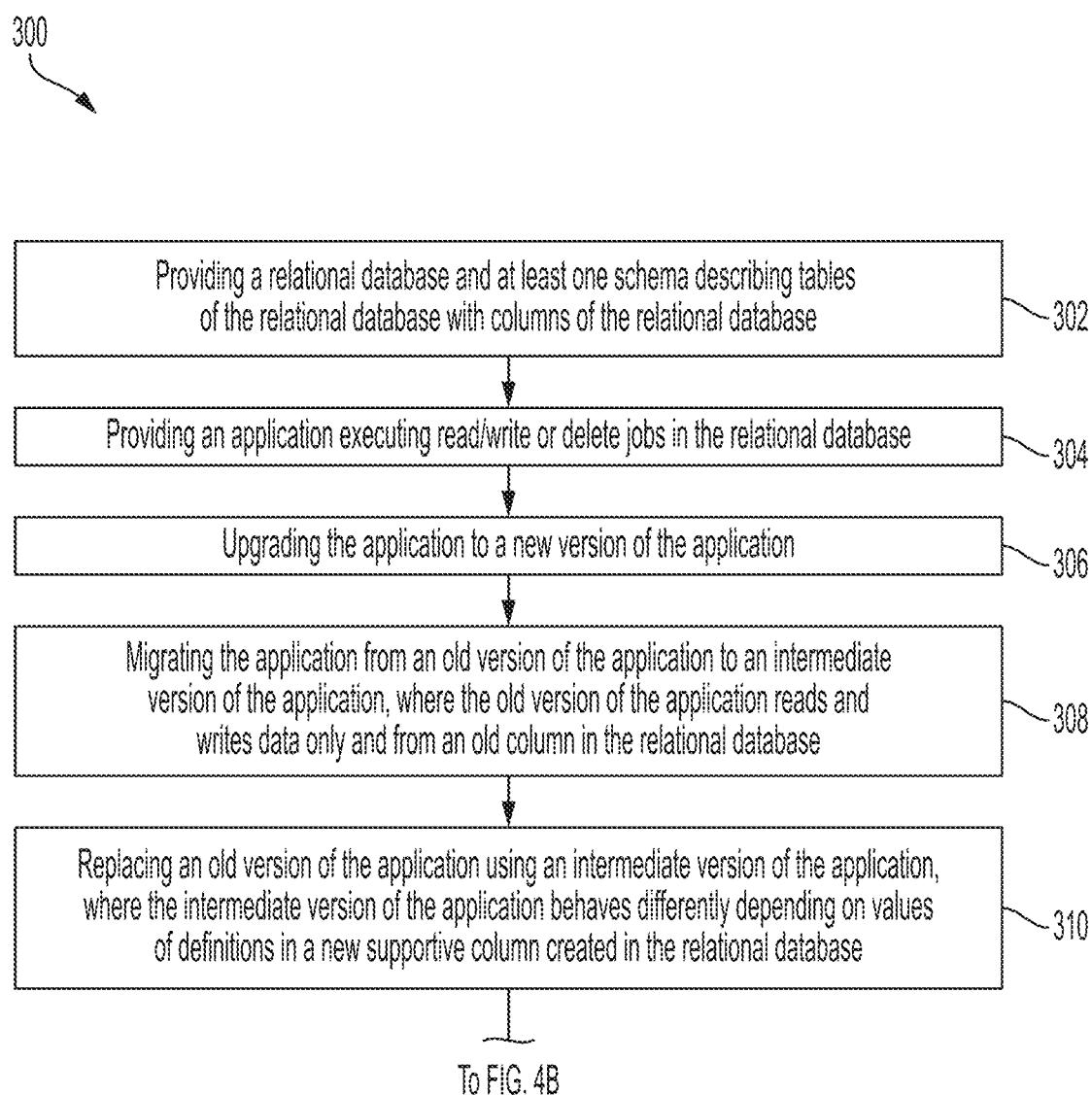
FIG. 4A depicts a flow chart of a first half of another method for upgrading relational database dependent services using the system of FIG. 1, in accordance with embodiments of the present invention.

FIG. 4A depicts a flow chart of a first half of another method 300 for upgrading relational database dependent services using the system 100 of FIG. 1, in accordance with embodiments of the present invention. According to the method 300, a first step 302 includes providing, by one or more processors of a computer system, a relational database, such as the relational database 140, and at least one schema describing tables of the relational database with columns of the relational database, such as the columns 142, 144, 146. The method 300 includes a next step 304 of providing, by the one or more processors of the computer system, an application, such as the application 130, executing read/write or delete jobs in the relational database, where the application is running in a cloud environment, such as the cloud implementation 113. The method 300 includes a step 306 of upgrading, by the one or more processors of a computer system, the application running in the cloud environment to a new version of the application, such as the new version 134, where the application uses pods to perform the steps of the upgrading, such as the pods 131, 133, 135. The method 300 includes a step 308 of migrating, by the one or more processors of the computer system, the application from an old version of the application, such as the old version 130, to an intermediate version of the application, such as the intermediate version 132, where the old version of the application reads and writes data only and from an old column in the relational database, such as the old column definitions 142. The method 300 includes a step 310 of replacing, by the one or more processors of the computer system, the old version of the application, using the intermediate version of the application, where the intermediate version of the application behaves differently depending on values of definitions in a new supportive column, such as the new supportive column 146, created in the relational database.

Figure 4B:
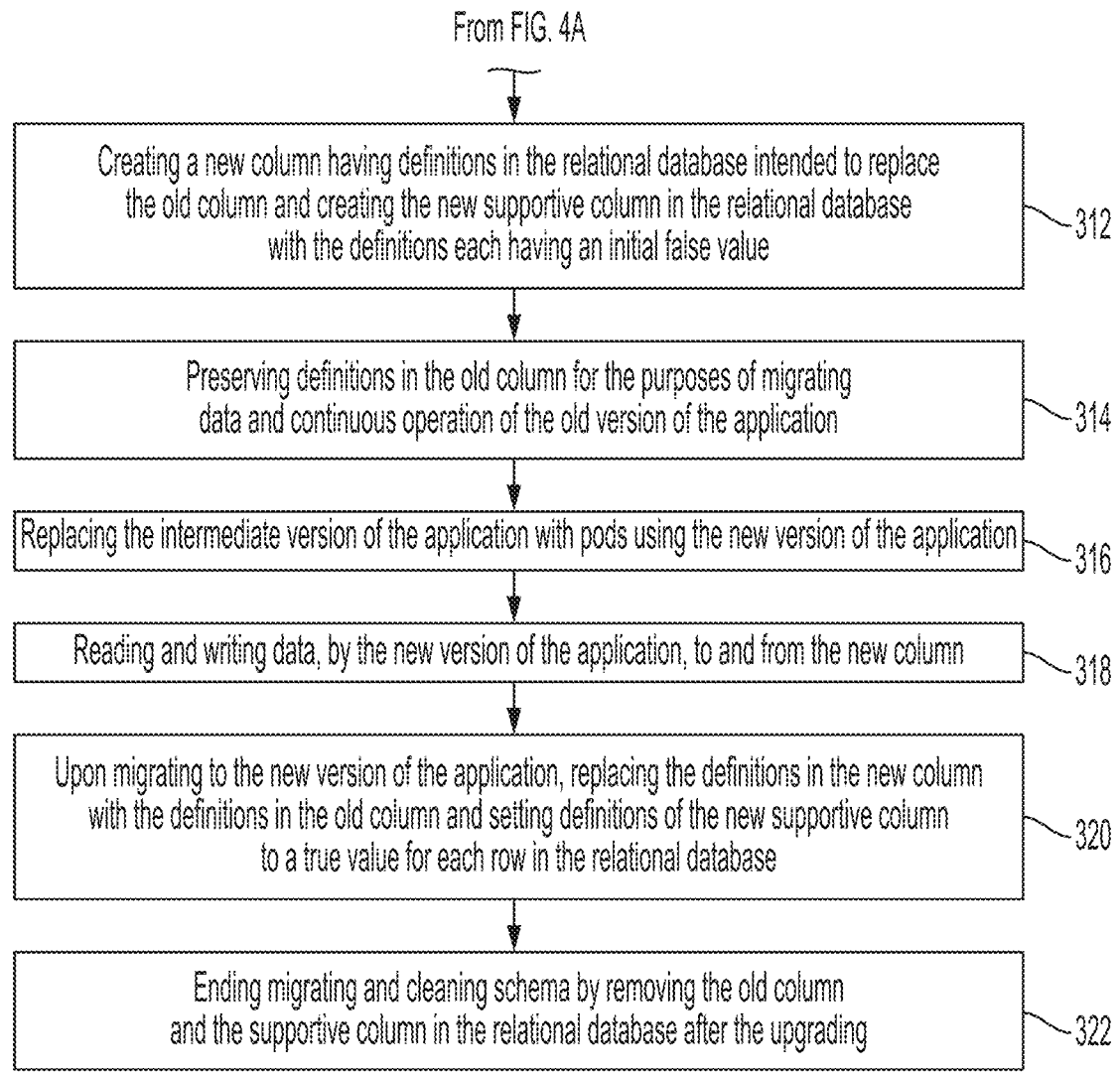
FIG. 4B depicts a flow chart of a second half of the method of FIG. 4A for upgrading relational database dependent services using the system of FIG. 1, in accordance with embodiments of the present invention.

FIG. 4B depicts a flow chart of a second half of the method 300 of FIG. 4A for upgrading relational database dependent services using the system 100 of FIG. 1, in accordance with embodiments of the present invention. The method 300 includes a step 312 of creating, by the one or more processors of the computer system, a new column, such as the new column definitions 144, having definitions in the relational database intended to replace the old column and creating the new supportive column in the relational database with the definitions each having an initial false value. The method 300 includes a step 314 of preserving, by the one or more processors of the computer system, definitions in the old column for the purposes of migrating data and continuous operation of the old version of the application. The method 300 includes a step 316 of replacing, by the one or more processors of the computer system, the intermediate version of the application with pods using the new version of the application. The method 300 includes a step 318 of reading and writing data, by the new version of the application, to and from the new column 318. The method 300 includes a step 320 of upon migrating to the new version of the application, replacing, by the one or more processors of the computer system, the definitions in the new column with the definitions in the old column and setting definitions of the new supportive column to a true value for each row in the relational database. Finally, the method 300 includes a final step 322 of ending, by the one or more processors of the computer system, migrating and cleaning schema by removing the old column and the supportive column in the relational database after the upgrading.

Figure 5:
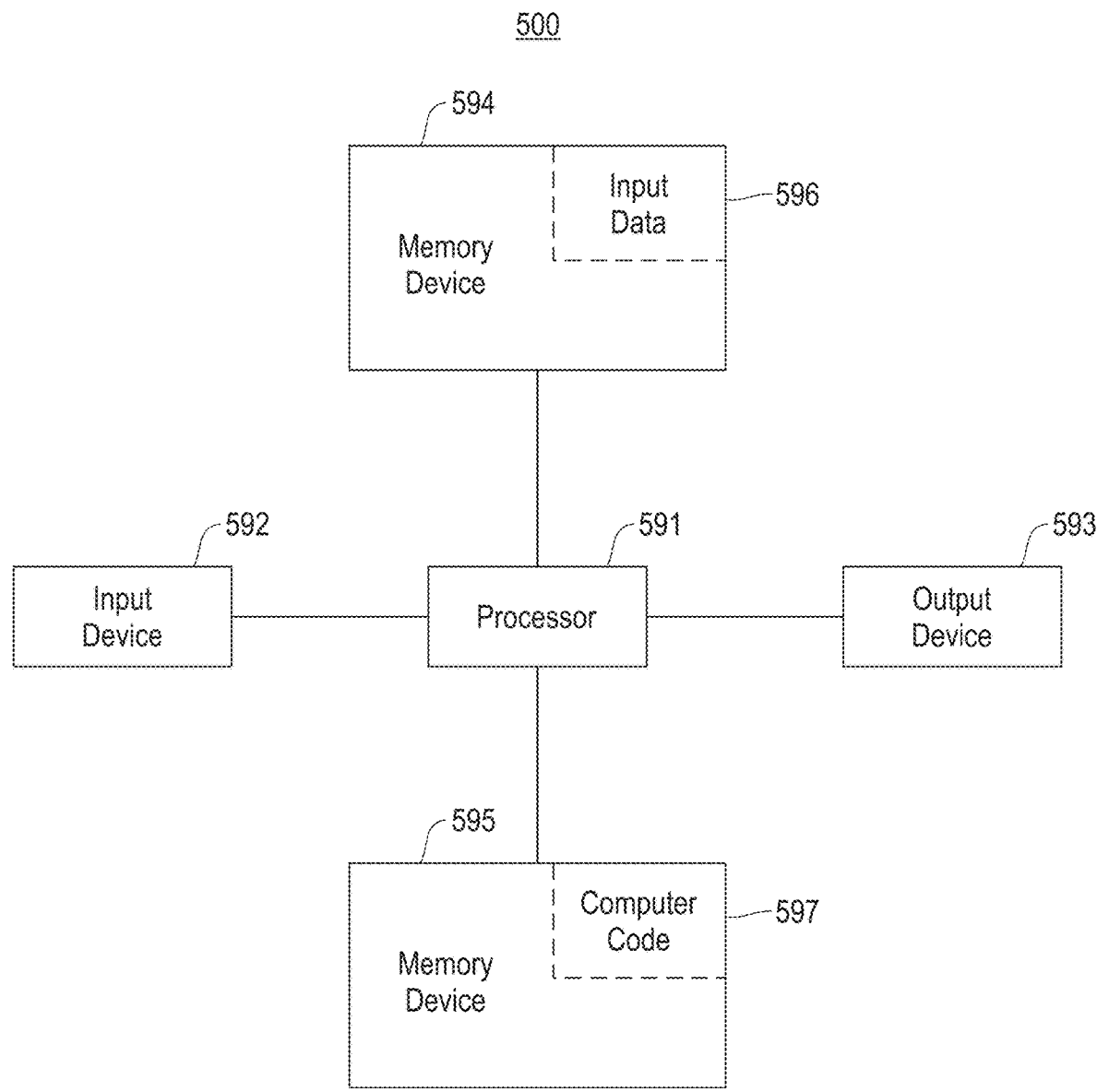
FIG. 5 depicts a block diagram of a computer system for the system for upgrading relational database dependent services of FIG. 1, capable of implementing methods such as those of FIGS. 3-4, in accordance with embodiments of the present invention.

FIG. 5 illustrates a block diagram of a computer system 500 for the system for upgrading relational database dependent services of FIG. 1, capable of implementing methods such as those of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for upgrading relational database dependent services, in the manner prescribed by the embodiments of FIGS. 3-4 using the system for upgrading relational database dependent services of FIGS. 1-2, wherein the instructions of the computer code 597 may be executed by processor 591 via memory device 595. The computer code 597 may include software or program instructions that may implement one or more algorithms for implementing the methods of automated feature toggle with annotations, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for automated feature toggle with annotations. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for automated feature toggle with annotations. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automated feature toggle with annotations. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automated feature toggle with annotations.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
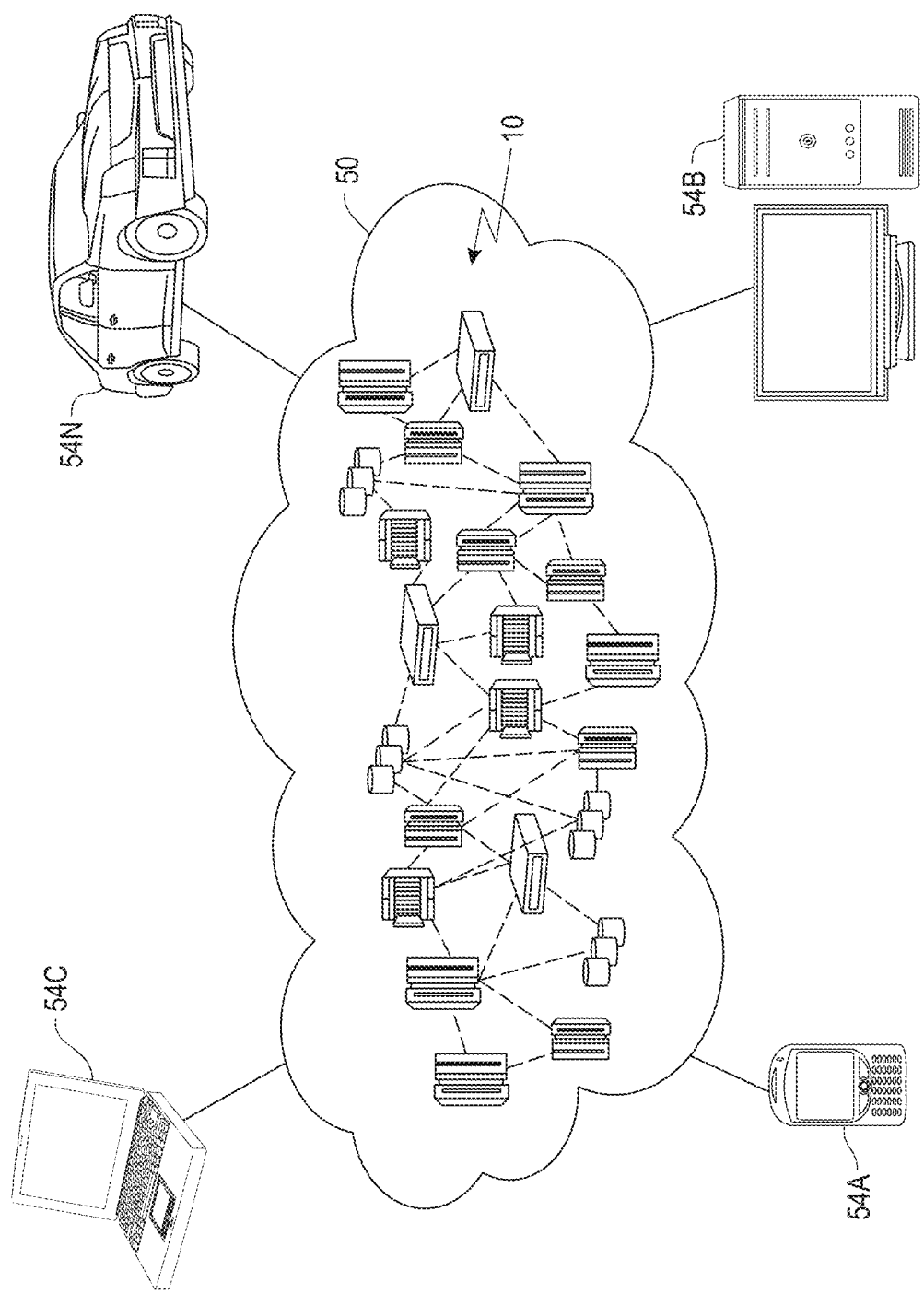
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
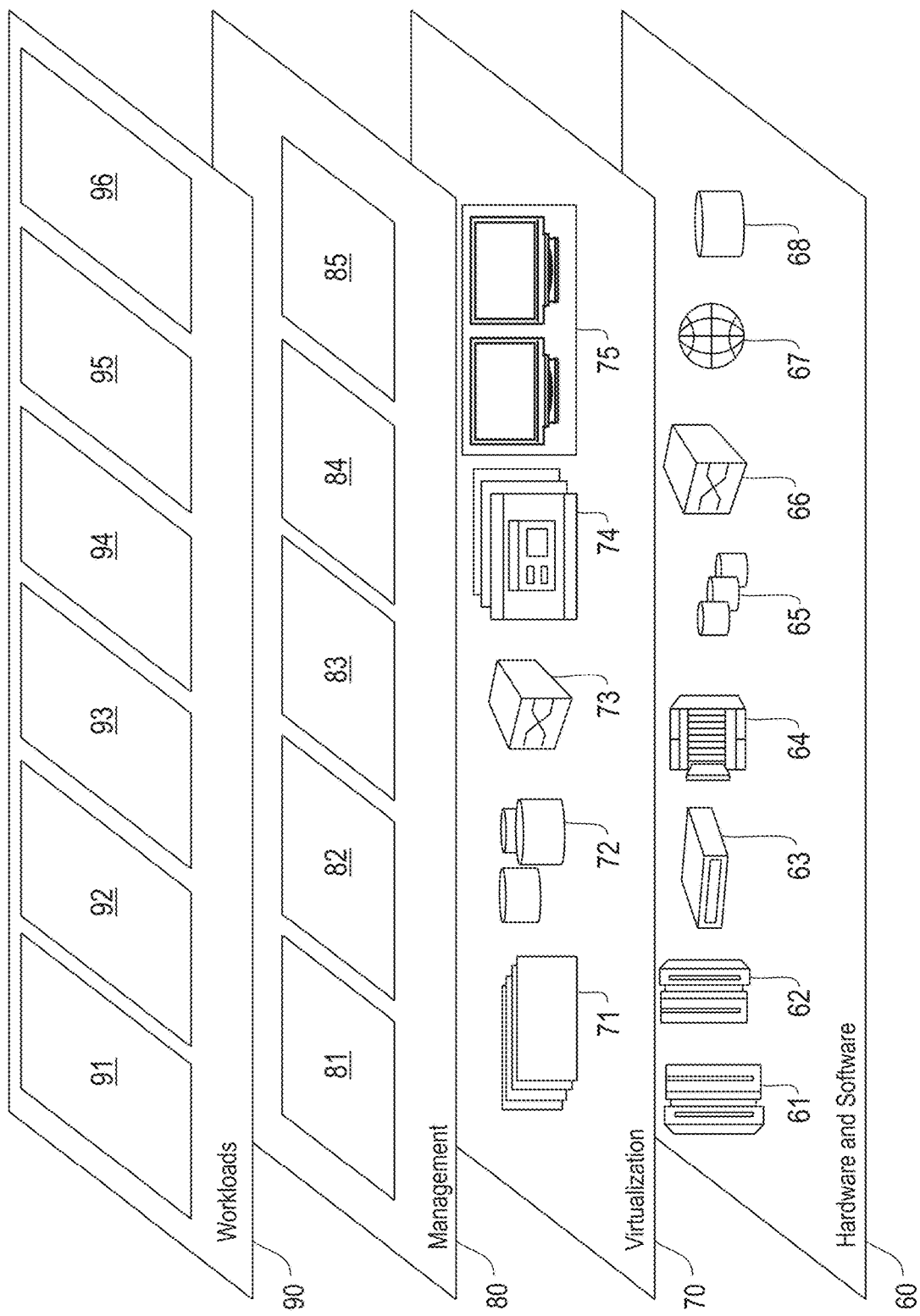
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: data management 91; deployment 92; upgrade or migration management 93; API management 94; pod management 95; and cleanup 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
providing, by one or more processors of a computer system, a relational database and at least one schema describing tables of the relational database with columns of the relational database;
providing, by the one or more processors of the computer system, an application executing read/write or delete jobs in the relational database, wherein the application is running in a cloud environment;
upgrading, by the one or more processors of the computer system, the application running in the cloud environment to a new version of the application, wherein the application uses pods to perform the steps of the upgrading;
replacing, by the one or more processors of the computer system, an old version of the application using an intermediate version of the application, wherein the intermediate version of the application behaves differently depending on values of definitions in a new supportive column created in the relational database; and
replacing, by the one or more processors of the computer system, the intermediate version of the application with pods using the new version of the application,
wherein the intermediate version of the application behaves by:
if a definition of the definitions in the relational database for the new supportive column has a true value, reading and writing data to a new column only;
if the definition of the definitions in the relational database for the new supportive column has a value other than true, writing data to both an old column and the new column, and reading data from the old column.

2. The method of claim 1, further comprising:
migrating, by the one or more processors of the computer system, the application from the old version of the application to the intermediate version of the application, wherein the old version of the application reads and writes data only to and from the old column in the relational database.

3. The method of claim 2, further comprising:
creating, by the one or more processors of the computer system, the new column having definitions in the relational database intended to replace the old column and creating the new supportive column in the relational database with the definitions each having an initial false value; and
preserving, by the one or more processors of the computer system, definitions in the old column for the purposes of migrating data and continuous operation of the old version of the application.

4. The method of claim 3, further comprising:
upon migrating to the new version of the application, replacing, by the one or more processors of the computer system, the definitions in the new column with the definitions in the old column and setting definitions of the new supportive column to a true value for each row in the relational database.

5. The method of claim 4, wherein the replacing, by the one or more processors of the computer system, the intermediate version of the application with pods using the new version of the application further comprises:
reading and writing data, by the new version of the application, to and from the new column.

6. The method of claim 5, further comprising:
ending, by the one or more processors of the computer system, migrating and cleaning schema by removing the old column and the supportive column in the relational database after the upgrading.

7. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for upgrading a relational database dependent application, the method comprising:
providing, by the one or more processors of the computer system, a relational database and at least one schema describing tables of the relational database with columns of the relational database;
providing, by the one or more processors of the computer system, an application executing read/write or delete jobs in the relational database, wherein the application is running in a cloud environment;
upgrading, by the one or more processors of the computer system, the application running in the cloud environment to a new version of the application, wherein the application uses pods to perform the steps of the upgrading;
replacing, by the one or more processors of the computer system, an old version of the application using an intermediate version of the application, wherein the intermediate version of the application behaves differently depending on values of definitions in a new supportive column created in the relational database; and replacing, by the one or more processors of the computer system, the intermediate version of the application with pods using the new version of the application,
wherein the intermediate version of the application behaves by:
if a definition of the definitions in the relational database for the new supportive column has a true value, reading and writing data to a new column only;
if the definition of the definitions in the relational database for the new supportive column has a value other than true, writing data to both an old column and the new column, and reading data from the old column.

8. The computer system of claim 7, the method further comprising:
migrating, by the one or more processors of the computer system, the application from the old version of the application to the intermediate version of the application, wherein the old version of the application reads and writes data only to and from the old column in the relational database.

9. The computer system of claim 8, the method further comprising:
creating, by the one or more processors of the computer system, the new column having definitions in the relational database intended to replace the old column and creating the new supportive column in the relational database with the definitions each having an initial false value; and
preserving, by the one or more processors of the computer system, definitions in the old column for the purposes of migrating data and continuous operation of the old version of the application.

10. The computer system of claim 9, the method further comprising:
upon migrating to the new version of the application, replacing, by the one or more processors of the computer system, the definitions in the new column with the definitions in the old column and setting definitions of the new supportive column to a true value for each row in the relational database.

11. The computer system of claim 10, wherein the replacing, by the one or more processors of the computer system, the intermediate version of the application with pods using the new version of the application further comprises:
reading and writing data, by the new version of the application, to and from the new column.

12. The computer system of claim 11, the method further comprising:
ending, by the one or more processors of the computer system, migrating and cleaning schema by removing the old column and the supportive column in the relational database after the upgrading.

13. A computer program product for upgrading a relational database dependent application, the computer program product comprising:
one or more computer readable storage media having computer readable program code collectively stored on the one or more computer readable storage media, the computer readable program code being executed by one or more processors of a computer system to cause the computer system to perform a method comprising:
receiving, by one or more processors of a computer system, source code;
providing, by the one or more processors of the computer system, a relational database and at least one schema describing tables of the relational database with columns of the relational database;
providing, by the one or more processors of the computer system, an application executing read/write or delete jobs in the relational database, wherein the application is running in a cloud environment;
upgrading, by the one or more processors of the computer system, the application running in the cloud environment to a new version of the application, wherein the application uses pods to perform the steps of the upgrading;
replacing, by the one or more processors of the computer system, an old version of the application using an intermediate version of the application, wherein the intermediate version of the application behaves differently depending on values of definitions in a new supportive column created in the relational database; and
replacing, by the one or more processors of the computer system, the intermediate version of the application with pods using the new version of the application,
wherein the intermediate version of the application behaves by:
if a definition of the definitions in the relational database for the new supportive column has a true value, reading and writing data to a new column only;
if the definition of the definitions in the relational database for the new supportive column has a value other than true, writing data to both an old column and the new column, and reading data from the old column.

14. The computer program product of claim 13, the method further comprising:
migrating, by the one or more processors of the computer system, the application from the old version of the application to the intermediate version of the application, wherein the old version of the application reads and writes data only to and from the old column in the relational database.

15. The computer program product of claim 14, the method further comprising:
creating, by the one or more processors of the computer system, the new column having definitions in the relational database intended to replace the old column and creating the new supportive column in the relational database with the definitions each having an initial false value; and
preserving, by the one or more processors of the computer system, definitions in the old column for the purposes of migrating data and continuous operation of the old version of the application.

16. The computer program product of claim 15, the method further comprising:
upon migrating to the new version of the application, replacing, by the one or more processors of the computer system, the definitions in the new column with the definitions in the old column and setting definitions of the new supportive column to a true value for each row in the relational database.

17. The computer program product of claim 16, wherein the replacing, by the one or more processors of the computer system, the intermediate version of the application with pods using the new version of the application further comprises:

reading and writing data, by the new version of the application, to and from the new column.

18. The computer program product of claim 17, the method further comprising:

ending, by the one or more processors of the computer system, migrating and cleaning schema by removing the old column and the supportive column in the relational database after the upgrading.

\* \* \* \* \*